US008129674B2

(12) United States Patent
Ogata et al.

(10) Patent No.: US 8,129,674 B2
(45) Date of Patent: Mar. 6, 2012

(54) MASS SPECTROMETRIC ANALYZER

(75) Inventors: Izumi Ogata, Tsuchiura (JP); Yasushi Terui, Tsuchiura (JP)

(73) Assignee: Hitachi High-Technologies Corporation, Tokyo (JP)

( * ) Notice: Subject to any disclaimer, the term of this patent is extended or adjusted under 35 U.S.C. 154(b) by 652 days.

(21) Appl. No.: 12/078,680

(22) Filed: Apr. 3, 2008

(65) Prior Publication Data

US 2008/0315082 A1 Dec. 25, 2008

(30) Foreign Application Priority Data

Apr. 4, 2007 (JP) ................................ 2007-098546

(51) Int. Cl.
*B01D 59/44* (2006.01)
*H01J 49/00* (2006.01)
*H01J 49/40* (2006.01)

(52) U.S. Cl. ......................... 250/281; 250/287; 250/288

(58) Field of Classification Search ........... 250/281–292
See application file for complete search history.

(56) References Cited

U.S. PATENT DOCUMENTS

| | | | | |
|---|---|---|---|---|
| 5,404,011 | A * | 4/1995 | Wells et al. | 250/282 |
| 5,420,425 | A * | 5/1995 | Bier et al. | 250/292 |
| 5,696,376 | A * | 12/1997 | Doroshenko et al. | 250/292 |
| 6,111,250 | A | 8/2000 | Thomson et al. | |
| 6,914,242 | B2 * | 7/2005 | Mordehai | 250/288 |
| 6,924,478 | B1 * | 8/2005 | Zubarev et al. | 250/282 |
| 6,992,285 | B1 * | 1/2006 | Cousins et al. | 250/292 |
| 7,034,292 | B1 * | 4/2006 | Whitehouse et al. | 250/289 |
| 7,049,580 | B2 * | 5/2006 | Londry et al. | 250/282 |
| 7,060,972 | B2 * | 6/2006 | Hager | 250/282 |
| 7,166,837 | B2 * | 1/2007 | Mordehai | 250/292 |
| 7,186,973 | B2 * | 3/2007 | Terui et al. | 250/287 |
| 7,227,137 | B2 * | 6/2007 | Londry et al. | 250/292 |
| 7,544,931 | B2 * | 6/2009 | Yamaguchi et al. | 250/282 |
| 7,728,288 | B2 * | 6/2010 | Makarov et al. | 250/282 |
| 2002/0070338 | A1 * | 6/2002 | Loboda | 250/287 |
| 2003/0189171 | A1 * | 10/2003 | Londry et al. | 250/292 |
| 2005/0167585 | A1 * | 8/2005 | Makarov et al. | 250/290 |
| 2005/0184232 | A1 * | 8/2005 | Yokosuka et al. | 250/287 |
| 2006/0043282 | A1 * | 3/2006 | Hidalgo et al. | 250/287 |

(Continued)

FOREIGN PATENT DOCUMENTS

JP 9-501536 2/1997

(Continued)

OTHER PUBLICATIONS

Japanese Office Action, with partial English translation thereof, issued in Japanese Patent Application No. 2007-098546, dated Aug. 2, 2011.

(Continued)

*Primary Examiner* — Jack Berman
*Assistant Examiner* — Brooke Purinton
(74) *Attorney, Agent, or Firm* — McDermott Will & Emery LLP

(57) ABSTRACT

A tandem mass spectrometer comprising an ion source for ionizing a sample, an ion trap section for carrying out collision induced dissociation of the target ions thereby to produce fragment ions, a multi electrode collision section for conducting collision induced dissociation of fragment ions discharged from the ion trap section, a mass spectrometer section for conducting mass spectrometric analysis of the converged fragment ions. After the target ions selected by the ion trap section are subjected to collision induced dissociation, specific fragment ions among the fragment ions are selected and transferred to the multi electrode collision section thereby to carry out collision induced dissociation therein.

7 Claims, 4 Drawing Sheets

U.S. PATENT DOCUMENTS

| | | | | |
|---|---|---|---|---|
| 2006/0192112 | A1* | 8/2006 | Mordehal | 250/290 |
| 2006/0255263 | A1* | 11/2006 | Ishimaru et al. | 250/288 |
| 2007/0138386 | A1* | 6/2007 | Makarov et al. | 250/288 |
| 2007/0187588 | A1* | 8/2007 | Yoshinari et al. | 250/288 |
| 2008/0067342 | A1* | 3/2008 | Ding | 250/282 |
| 2008/0191129 | A1* | 8/2008 | Makarov et al. | 250/282 |
| 2008/0217527 | A1* | 9/2008 | Wang | 250/282 |
| 2008/0280317 | A1* | 11/2008 | Wu et al. | 435/23 |
| 2009/0014639 | A1* | 1/2009 | Bateman | 250/281 |
| 2009/0173877 | A1* | 7/2009 | Bateman et al. | 250/282 |
| 2009/0283675 | A1* | 11/2009 | Franzen | 250/288 |

FOREIGN PATENT DOCUMENTS

| | | |
|---|---|---|
| JP | 2001-526447 A | 12/2001 |
| JP | 2002-184348 | 6/2002 |
| JP | 2002-313276 | 10/2002 |
| JP | 2004-004082 | 1/2004 |
| JP | 2004-303719 | 10/2004 |
| JP | 2004-335417 | 11/2004 |
| JP | 2005-183328 | 7/2005 |
| JP | 2006-127907 | 5/2006 |
| WO | WO 94/28575 | 12/1994 |
| WO | WO 99/30350 A1 | 6/1999 |

OTHER PUBLICATIONS

Japanese Office Action, w/ English translation thereof, issued in Japanese Patent Application No. JP 2007-098546 dated May 10, 2011.

* cited by examiner

MASS SPECTROMETRIC ANALYZER

CLAIM OF PRIORITY

The present application claims priority from Japanese patent application serial no. 2007-098546, filed on Apr. 4, 2007, the content of which is hereby incorporated by reference into this application.

FIELD OF THE INVENTION

The present invention relates to a tandem type mass spectrometric analyzer that is capable of carrying out SM$^n$ analysis.

RELATED ART

A mass spectrometric analyzer is an apparatus that ionizes sample molecules, separates them in a magnetic field or electric field in accordance with ratios of mass to charges (M/Z), and detects amounts of separated target ions to measure mass numbers of sample molecules.

There are ion trap type mass spectrometer and time of flight (TOF) type mass spectrometer wherein mass spectrometric analysis is carried out with an ion trap mass spectrometric analysis section and the time of flight mass spectrometric analysis section, respectively. The time of flight type mass spectrometer can perform a high accuracy mass spectrometry and high identification of fragment ions. Particularly, the time of flight mass spectrometer is useful for mass spectrometry of structure analysis of unknown compounds.

In the ion trap type mass spectrometer it is possible to dissociate sample molecules by collision induced dissociation wherein the sample molecules are collided with gas molecules in the ion trap while trapping target ions, discharging or selecting unnecessary ions other than the target ions and changing an orbit of the selected ions in the ion trap.

In the ion trap type mass spectrometer a three dimensional quadrupole electric field is formed within an inner space of electrodes to which high frequency potential is applied. An ionized sample is introduced into the inner space and retained temporarily within the three dimensional quadrupole electric field. This is called trap of ions.

The trapped ions make a stable orbit with a specific frequency in the inner space in accordance with a mass/charge ratio The ion trap scans the trapped ions with high frequency voltage so as to discharge the ions other than the target ions from the space, thereby to retain only the target ions in the space. This is called a selection of ions. Selection of ions is carried out with the controller 9 that changes voltage of the ion trap section 50 to thereby control an electric field.

Then, the ion trap applies a high frequency voltage to the selected target ions so as to enlarge the orbit of the target ions in the space.

As a result, the target ions repeat collision with neutral molecules in the space thereby to dissociate bonds in the target ions to generate fragment ions. This is called a collision induced dissociation.

The process is called an MS$^n$ analysis, wherein the ion trapping, selection and dissociation are repeated by n times. Dissociated ions of the sample are generated by the MS$^n$ analysis, wherein weaker bonds of the selected sample molecules whose bonding energy is relatively small are dissociated.

Accordingly, it is possible to analyze a molecular structure of the sample from the mass numbers of the dissociated ions obtained by the MS$^n$ analysis.

The MS$^n$ analysis using the ion trap is disclosed in Japanese patent laid-open 2004-303719, Japanese patent laid-open 2004-335417, Japanese patent laid-open 2005-183328, Japanese patent laid-open 2006-127907. Among the publications, JP 2004-303719 discloses a tandem type mass spectrometer comprising an ion source, an ion trap section, a collision damping section and a time of flight mass spectrometer section. This publication does not disclose a combination of collision induced dissociation by the ion trap section and the multi pole lens. JP 2004-335417 discloses a linear type ion trap section, a multi pole ion collision section and a time of flight mass spectrometer; however, this publication does not disclose the combination of collision induced dissociation by the ion trap section and the multi pole ion collision section.

The descriptions of the JP 2004-303719 and JP 2004-335417 are hereby incorporated by reference into the specification of this application in their entireties.

Japanese patent laid-open 2004-303719
Japanese patent laid-open 2004-335417
Japanese patent laid-open H09-501536
Japanese patent laid-open 2002-184348
Japanese patent laid-open 2002-313276

The ion trap type mass spectrometer can perform MS$^n$ analysis wherein the target ion trap, selection of the target ions and dissociation of the target ions.

In the conventional MS$^n$ analysis by the ion trap type mass spectrometer, however, a cut-off of low mass number ions at the time of collision induced dissociation takes place; in case of a three-dimensional ion trap mass number of about ⅓ or less than that of the target ions cannot be trapped or in case of the linear ion trap about ¼ or less than that of the target ions cannot be trapped.

Accordingly, the dissociated ions (fragment ions) having small mass numbers, which are produced by collision induced dissociation by the ion trap, could not be detected.

Therefore, in the MS$^n$ analysis with the ion trap section it was impossible to utilize low mass number dissociated ions as information on the structure of the sample.

SUMMARY OF THE INVENTION

The present invention aims at the MS$^n$ analysis that utilizes at least three times of the trapping, selection and dissociation, which is an important feature of the ion trap; wherein even low mass number dissociated ions (fragment ions) produced in the collision induced dissociation are detected, in addition to target ions having large mass numbers produced by collision induced dissociation with the ion trap section.

In order to solve the above-mentioned object, the present invention provides a mass spectrometer, which comprises an ion source for ionizing a sample, an ion trap section for selectively trapping target ions from the ions produced in the ion source and for effecting collision induced dissociation of the target ions, a multi-pole ion-collision section for effecting the collision induced dissociation of the fragment ions produced in the ion trap section, and a mass spectrometric section for carrying out mass spectrometric analysis of the fragment ions produced by the dissociation in the ion collision section.

The present invention is based on the fact that the collision induced dissociation by the ion trap produces different fragment ions and fragment ions having small mass numbers tend to be cut-off in the ion trap section, but fragment ions produced by the collision induced dissociation in the multi pole ion collision section may be kept therein. As a result, even minute fragments ions can be subjected to mass analysis when the collision induced dissociation by the ion trap and that by the multi pole ion collision section are combined.

According to the present invention, it is possible to detect fragment ions with low mass numbers, because the fragment ions produced in the ion trap section are further refined by the ion collision induced dissociation section so that influence of the ion cut-off can be minimized.

REFERENCE NUMERALS

1; sample introduction section, 2; ion source, 3; aperture, 4; ion transfer section, 5; ion trap, 6; quadrupole, 7; time of flight mass spectrometer, 8; detector, 9; controller, 10; data processing section, 11; signal line, 40; ion transfer section, 50; ion trap section, 60; ion collision section, 100; mass spectrometer main body, P1, P2, P3; vacuum pump

DETAILED DESCRIPTION OF THE PREFERRED EMBODIMENTS

In the following the present invention will be explained in detail by reference to drawings.

Figure 1:
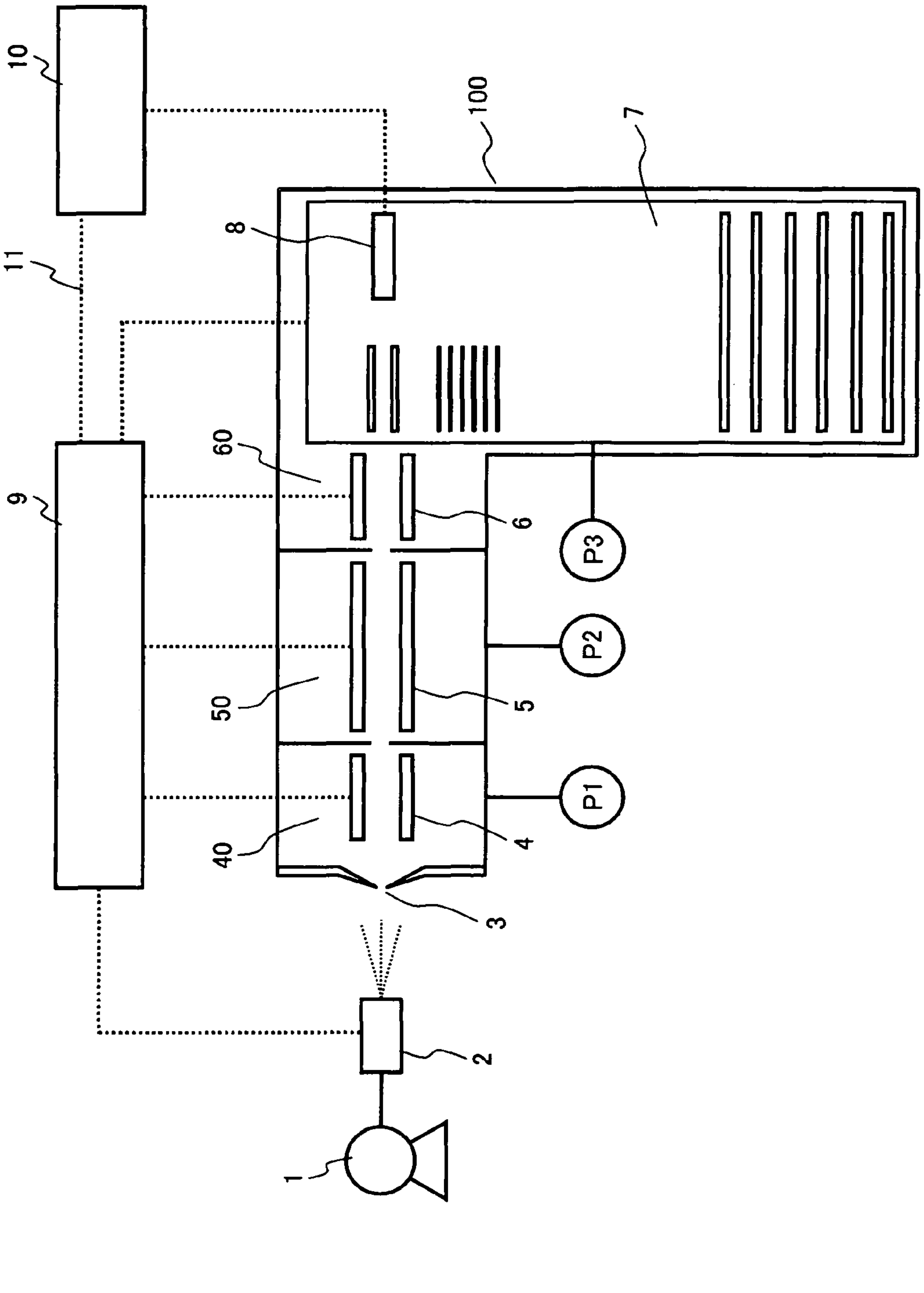
FIG. 1 shows a schematic diagram of a mass spectrometer according to an embodiment of the present invention.

FIG. 1 shows a schematic view of the mass spectrometer according to an embodiment of the present invention.

The mass spectrometric analyzer comprises, as shown in FIG. 1, a sample introduction section 1, an ion source 2, a mass spectrometer main body 100, a controller 9, and a date processing section 10, wherein signal lines 11 connect the ion source 2, mass spectrometric analyzer 100, controller 9 and data processing section 10.

At the ion source 2, ionization of the sample is carried out under an atmospheric pressure. The sample introduced by the sample introduction section 1 is supplied to the mass spectrometer main body 100 after ionization of the sample.

The mass spectrometer main body 100 comprises the ion transport section 40, ion trap section 50, ion collision section 60 and time of flight type mass spectrometer section 7, wherein the interior thereof is kept high vacuum. The sections are arranged in order so that the ions can travel from the ion transport section 40 through ion trap section 50 and ion collision section 60 towards the mass spectrometric section 7.

The ion transport section 40 is equipped with multi-electrodes 4. The ion trap section 50 is a linear ion trap of a quadrupole structure. The quadrupole is the most suitable structure for the ion collision induced dissociation because of its easiness of controlling with high precision. The ion trap 5 is a three-dimensional ion trap. The linear ion trap section can retain a large amount of ions, compared with a three dimensional ion trap section as disclosed in JP 2004-303719. As a result, space charge-up of the ion trap section can be avoided and it is possible to keep a high accuracy of mass analysis.

The vacuum pump P1 evacuates the ion transport section 40, a vacuum pump P2 evacuates the ion trap section 50, and a vacuum pump P3 evacuates the ion collision section 60 and the mass spectrometric section 7. Vacuum degrees of the vacuum pumps P2 and P3 are higher than that of P1.

The ions of the sample ionized in the ion source 2 are introduced into the ion transport section 40 through a small aperture 3, and then flows through the ion trap section 50, ion collision section 60 and the flying type mass spectrometric analyzer 7 to carry out mass spectrometry.

Mass spectrometry of the present invention will be explained in the following.

An operator sets analytical conditions by the controller 9 in the mass spectrometer in advance. The explanation on the $MS^n$ analysis will be made in this embodiment.

The sample is introduced into an ion source through a sample introduction device 1, where ionized sample ions are introduced into the mass spectrometer main body 100 (inside of MS) through the aperture 3 and introduced into the ion trap section 50 through an ion transfer section 40.

The ion trap section 50 traps the sample ions and starts $MS^3$ analysis in accordance with measurement conditions decided by the operator. The ion trap section 50 selects only target ions from the sample ions trapped in the ion trap section 50. The ion trap section 50 carries out collision induced dissociation ($MS^2$ analysis) in the ion trap 5 to produce first fragment ions.

Then, the ion trap section 5 selects only second target ions that satisfy the conditions determined by the operator from the first fragment ions, and ions other than the second target ions are discharged. The ion trap section 50 transfers the selected second ions to the multi pole ion collision section 60 provided with multi electrodes 6.

The multi pole ion collision section 60 with multi electrodes 6 caries out a second collision induced dissociation ($MS^3$ analysis) by neutral ions such as nitrogen molecules in the ion collision section 60 thereby to produce second fragment ions.

The second fragment ions are introduced into the time of flight mass spectrometer 7 from the ion collision section 60 to carry out mass spectrometry, which is detected by a detector 8.

At this time, the second fragment ions are not influenced by cut-off of minute ions, which is observed in the ion collision induced dissociation in the ion trap section.

Accordingly, in addition to the fragment ions selected by the ion trap section, all of the second fragment ions are subjected to mass spectrometry in the time of flight mass spectrometer 7 and detected by the detector 8. As a result, all of the low mass number dissociated ions (fragment ions) are detected.

As the ion collision section 60 with multi electrodes 6, a hexapole or octapole ion collision section can be used in place of the quadrupole ion collision section. As an example of the neutral molecule gas there are rare gases such as helium, neon, argon, etc, in place of nitrogen.

The larger the molecular size of the neutral molecules, the larger the frequency of collision with the sample ions becomes. Therefore, the neutral molecules of large molecular size is suitable for collision induced dissociation of large sample ions.

Figure 2:
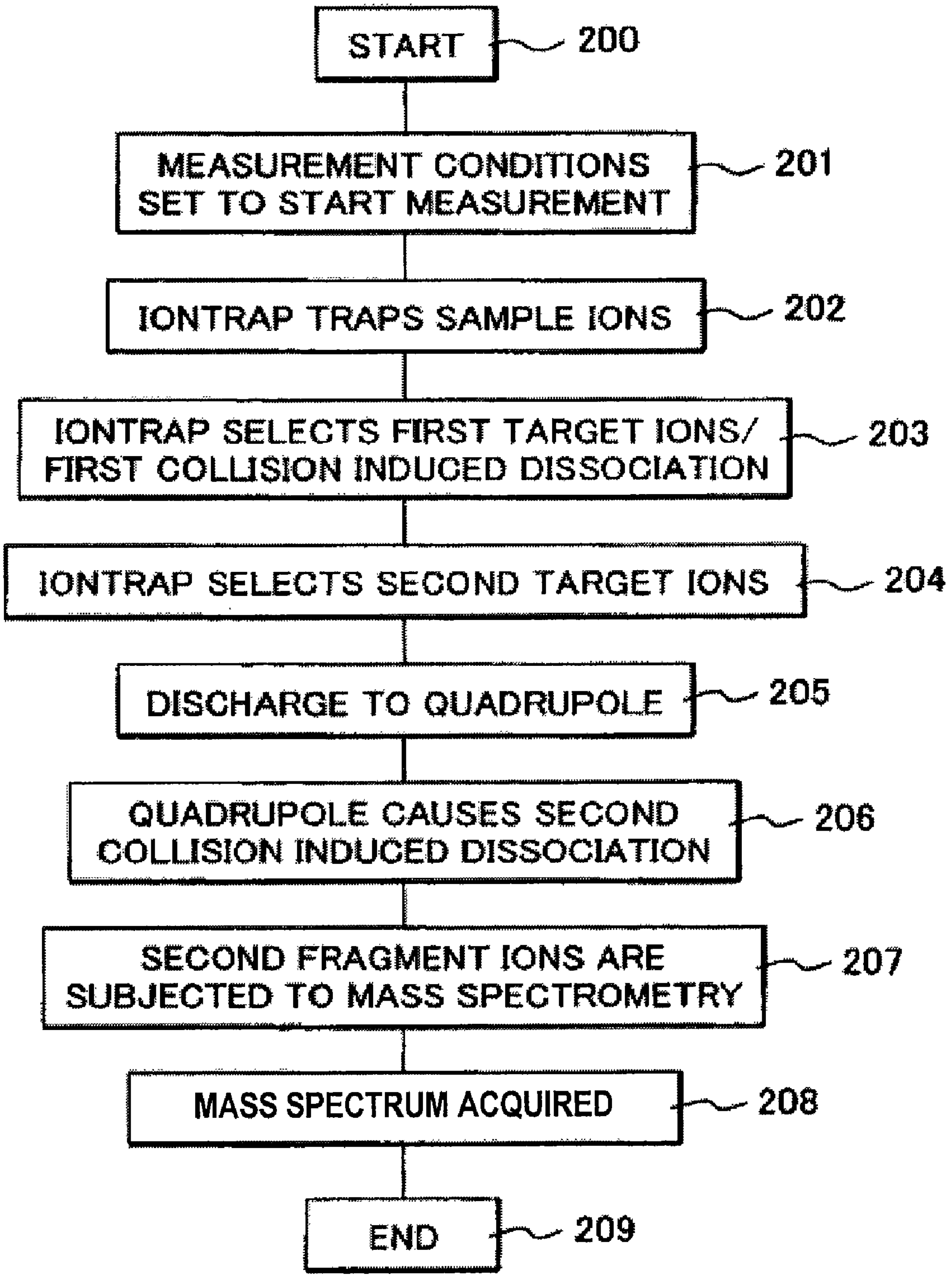
FIG. 2 shows a sequence of mass spectrometry of a first embodiment of the present invention.

FIG. 2 shows a sequence of a mass spectrometry according to a first embodiment of the present invention.

As shown in FIG. 2, the mass spectrometry starts with step 200 and spectrometric conditions are set at step 201.

At step 202, ion trap section traps sample ions and further selects the first target ions. The selected ions are subjected to a first collision induced dissociation to produce the first fragment ions at step 203. The ion trap section selects second target ions from the produced fragment ions in the trap section at step 204. The second target ions are introduced into the quadrupole ion collision section 60 at step 205.

The quadrupole ion collision section 60 carries out second collision dissociation at step 206 to produce second fragment ions. The second fragment ions are subjected to mass analysis by the mass spectrometer 7 at step 207. Mass spectrometry is acquired at step 208 and the analysis ends at step 209.

As was explained above, the present embodiment conducts n times of selection of target ions by the ion trap section, followed by n times of collision induced dissociation to produce nth fragment ions. After the nth fragment ions are trapped by the ion trap section, and the trapped ions are discharged to the quadrupole ion collision section 60 to carry out n+1st collision induced dissociation.

Because the multi electrode ion collision section does not lose or cut off the low mass number fragment ions produced by the multi pole ion collision section, it is possible to analyze minute molecular structure of the sample with high accuracy by the mass spectrometric analysis section.

Figure 3:
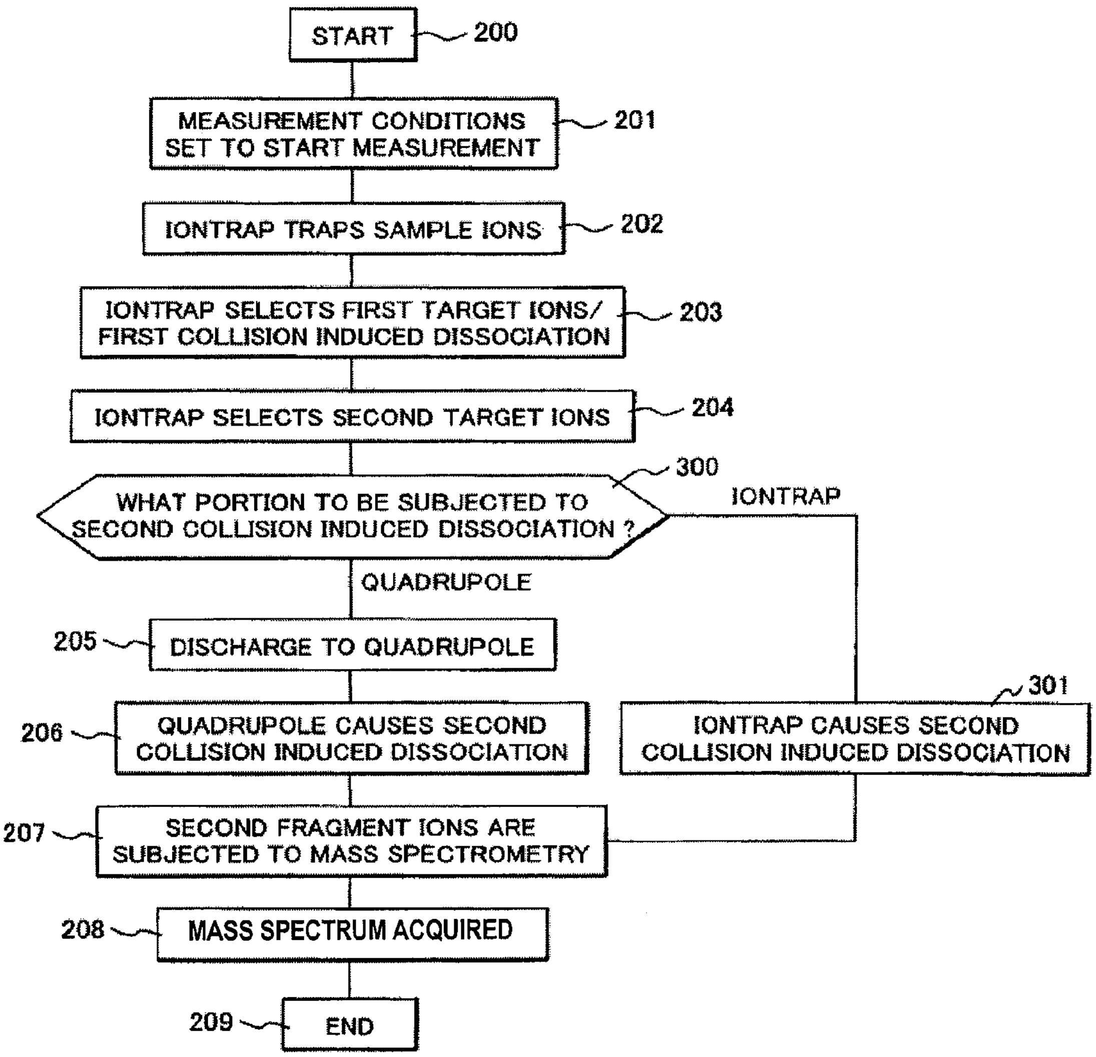
FIG. 3 shows a sequence of mass spectrometry of a second embodiment of the present invention.

FIG. 3 shows a mass spectrometry sequence according to a second embodiment of the present invention.

The second embodiment differs from the first embodiment only in the following points, and others are the same as in the first embodiment.

In the second embodiment the second target ions are selected at step 204 and next collision induced dissociation by the ion trap section 50 or the quadrupole ion trap section 60 with the quadrupole is automatically selected by a controller 9 in accordance with a mass/charge number ratio (M/Z) and a valence number of charges at step 300. This method, which automatically conducts collision induced dissociation by both the ion trap section and ion collision section, contributes to acquisition of useful data from an unknown sample.

For example, if the mass/charge ratio of the second target ions is high and the valence number is 1, the controller 9 judges that probability of formation of the second fragment ions in the collision induced dissociation by the ion trap section is high so that the second collision dissociation is conducted at the quadrupole ion collision section at step 206. As a result, the cut-off of the fragment ions can be avoided in the second embodiment. Since such the low mass number fragment ions may be contained in a cut-off zone in the ion trap section, they are not analyzed. Note that the cut-off zone of the ion trap is observed in ¼ to ⅓ of the mass/charge valence ratio of target ions. Therefore, the controller 9 judges that the second collision induced dissociation should be performed by the multi pole ion collision section, not by the ion trap.

After the first collision induced dissociation, controller 9 judges the mass/charge ratio and valence of the second target ions. If the mass/charge ratio of the second target ions is large and the valence is 1, the fragment ions produced by the second collision induced dissociation becomes ions with valence of 1, which have a small mass number.

According to the automatic selection function of the controller 9, the second collision induced dissociation is selectively conducted by the ion trap section or the ion collision section.

If the controller 9 judges at step 300 that a mass number of the second fragment ions is larger than the cut-off zone of the ion trap section, the second collision induced dissociation is conducted by the ion trap section and mass spectrometry of the produced fragment ions is conducted.

Figure 4:
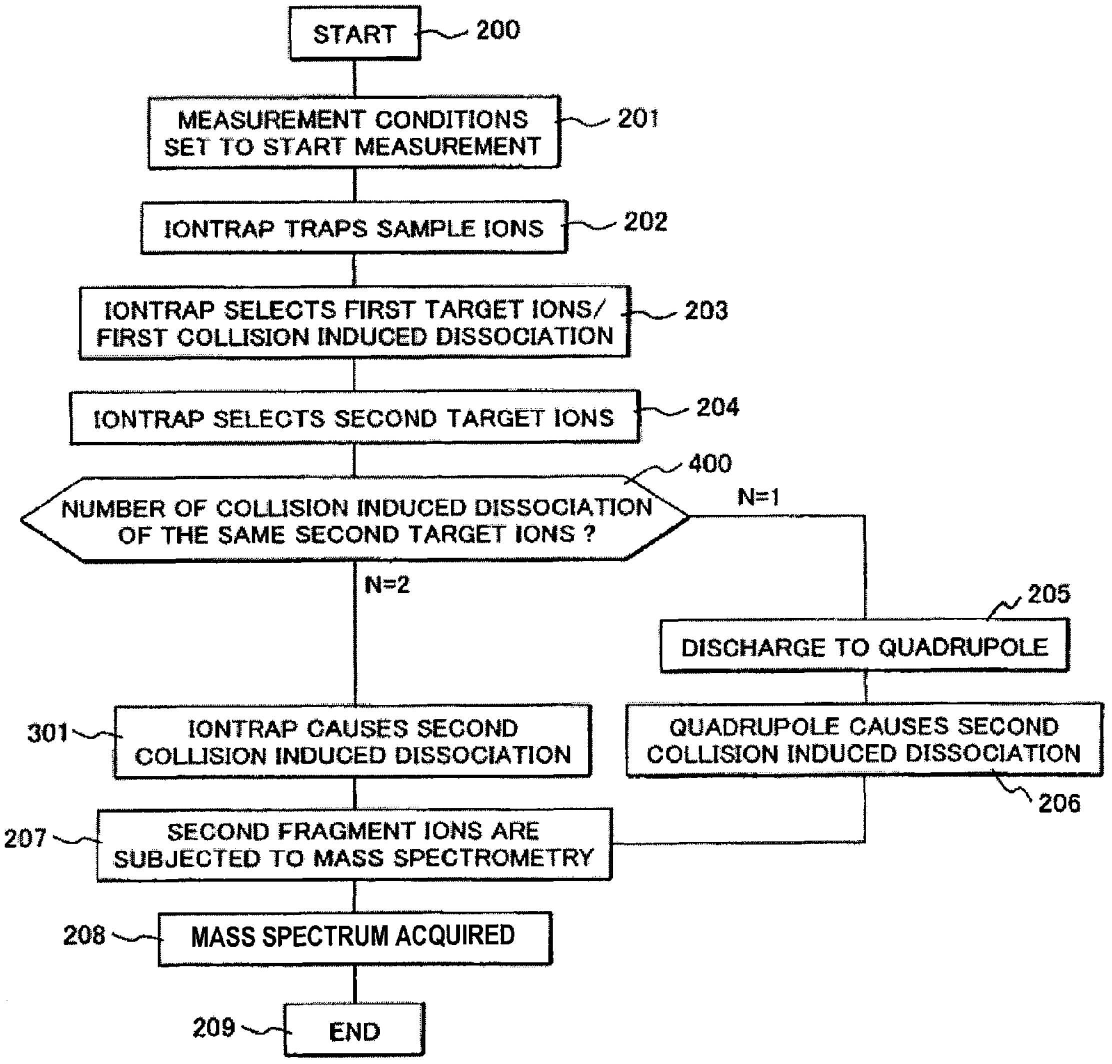
FIG. 4 shows a sequence of mass spectrometry of a third embodiment of the present invention.

FIG. 4 shown a analysis sequence of a third embodiment of the present invention.

The third embodiment differs from the first embodiment only in the following points, and others are the same as in the first embodiment.

In the third embodiment the second collision induced dissociation of the fragment ions by the ion trap section 50 and that by the quadrupole ion collision section 60 are alternately conducted as long as the mass number of the second fragment ions are larger than the mass numbers of the ions cut-off in the ion trap section. According to this method, the accuracy of analysis is further increased.

The alternate collision induced dissociation by the ion trap section and by the multi pole ion collision section has the following advantages.

Mass spectral of the fragment ions having small mass/charge valence ratio is obtained from the fragment ions by the ion collision section.

The fragment ions for the next cycle collision induced dissociation are produced by the ion trap section which can perform MSn analysis, because selection and dissociation can be repeated many times.

What is claimed is:

1. A tandem mass spectrometer comprising:

an ion source for ionizing a sample;

an ion trap section for carrying out collision induced dissociation of the target ions for producing fragment ions and for discharging unnecessary ions other than target ions;

a multi electrode collision section for, carrying out collision induced dissociation of the fragment ions introduced therein;

a mass spectrometric analysis section for conducting mass spectrometric analysis of the converged fragment ions; and a controller programmed to perform:

selecting, after the target ions selected by the ion trap section are subjected to collision induced dissociation, specific fragment ions among the fragment ions and transferring the specific fragment ions to the multi electrode collision section to carry out collision induced dissociation therein, automatically selecting either the collision induced dissociation in the trap section or the collision induced dissociation in the multi-electrode collision section in accordance with a signal from a data processing section, and if the controller judges that a mass number of the second fragment ions is larger than a cut-off zone of the ion trap section, conducting a second collision induced dissociation is by the ion trap section and conducting mass spectrometry of the produced fragment ions.

2. The tandem mass spectrometer according to claim 1, wherein the mass spectrometric analysis section comprises a time of flight type mass spectrometer section.

3. The tandem mass spectrometer according to claim 1, wherein before the ion trap section discharges the fragment ions to the multi electrode collision section, the controller allows the ion trap section to repeat selection, discharge and dissociation of the fragment ions at least two times.

4. The tandem mass spectrometer according to claim 1, wherein the ion trap section comprises a linear ion trap.

5. The tandem mass spectrometer according to claim 1, wherein the ion trap section comprises a three dimensional ion trap.

6. The tandem mass spectrometer according to claim 1, wherein the multi electrode collision section comprises a quadrupole.

7. The tandem mass spectrometer according to claim 1, wherein the controller carries out alternately the collision induced dissociation in the ion trap section and the multi electrode collision section.

* * * * *